United States Patent
Nam

(10) Patent No.: US 9,921,693 B2
(45) Date of Patent: Mar. 20, 2018

(54) METHOD AND DEVICE FOR PROCESSING MULTI-TOUCH INPUT

(71) Applicant: MELFAS INC., Seongnam-si, Gyeonggi-do (KR)

(72) Inventor: Sungsik Nam, Seoul (KR)

(73) Assignee: MELFAS INC., Seongnam-si, Gyeonggi-do (KR)

( * ) Notice: Subject to any disclaimer, the term of this patent is extended or adjusted under 35 U.S.C. 154(b) by 522 days.

(21) Appl. No.: 14/412,991

(22) PCT Filed: Jul. 8, 2013

(86) PCT No.: PCT/KR2013/006031
§ 371 (c)(1),
(2) Date: Jan. 5, 2015

(87) PCT Pub. No.: WO2014/007589
PCT Pub. Date: Jan. 9, 2014

(65) Prior Publication Data
US 2015/0205404 A1    Jul. 23, 2015

(30) Foreign Application Priority Data
Jul. 6, 2012   (KR) ..................... 10-2012-0073704

(51) Int. Cl.
*G06F 3/044*   (2006.01)
*G06F 3/041*   (2006.01)

(52) U.S. Cl.
CPC ............. *G06F 3/044* (2013.01); *G06F 3/0414* (2013.01); *G06F 3/0416* (2013.01); *G06F 2203/04104* (2013.01)

(58) Field of Classification Search
None
See application file for complete search history.

(56) References Cited

U.S. PATENT DOCUMENTS 6,995,752 B2   2/2006   Lu
8,407,606 B1 *  3/2013   Davidson .............. G06F 3/0488
                                                         345/173
(Continued)

FOREIGN PATENT DOCUMENTS

KR   10-2004-0063142 A   7/2004
KR   10-2011-0050481 A   5/2011
(Continued)

OTHER PUBLICATIONS

Patent Cooperation Treaty, International Search Report, PCT/KR2013/006031, dated Dec. 2, 2013, 5 Pages (including English translation).

*Primary Examiner* — Alexander Eisen
*Assistant Examiner* — Kebede Teshome
(74) *Attorney, Agent, or Firm* — Fenwick & West LLP

(57) ABSTRACT

The present invention relates to a method and a device for processing a multi-touch input, comprising the steps of: detecting whether an overlapping region exists between a first input region and a second input region when a multi-touch input occurs on a touch panel; computing a center point of the first input region, a center point of the second input region, and a center point of the overlapping region when an overlapping region exists; determining a first straight line passing through the center point of the first input region, a second straight line passing through the center point of the second input region, and a third straight line passing through the center point of the overlapping region; computing the sum of touch input forces of regions surrounding each of the first straight line, the second straight line, and the third straight line; and determining whether to merge the first input region and the second input region by comparing the sum of the touch input forces of the regions surrounding the first or second straight line when the sum of (Continued)

the touch input forces of the regions surrounding the third straight line.

17 Claims, 6 Drawing Sheets

(56) References Cited

U.S. PATENT DOCUMENTS

| | | | |
|---|---|---|---|
| 9,122,341 B2* | 9/2015 | Benko | G06F 3/0416 |
| 2003/0063073 A1* | 4/2003 | Geaghan | G06F 3/0416 |
| | | | 345/173 |
| 2006/0097991 A1* | 5/2006 | Hotelling | G06F 3/0416 |
| | | | 345/173 |
| 2008/0087477 A1* | 4/2008 | Cho | G06F 3/0416 |
| | | | 178/18.01 |
| 2010/0053116 A1 | 3/2010 | Daverman et al. | |
| 2010/0156804 A1* | 6/2010 | Young | G06F 3/0416 |
| | | | 345/173 |
| 2011/0069029 A1* | 3/2011 | Ryu | G06F 3/0416 |
| | | | 345/173 |

FOREIGN PATENT DOCUMENTS

| | | |
|---|---|---|
| KR | 10-2011-0066834 A | 6/2011 |
| KR | 10-1133493 B1 | 8/2011 |
| WO | WO 03/041006 A1 | 5/2003 |

* cited by examiner

METHOD AND DEVICE FOR PROCESSING MULTI-TOUCH INPUT

TECHNICAL FIELD

Embodiments of the inventive concept relate to touch screen input, and more particularly to multi-touch input processing method and device capable of computing an input point exactly when a plurality of touch inputs occurs at adjacent areas.

BACKGROUND ART

A touch screen recognizes user's screen touch or gesture as input information and is classified as a resistive type, a capacitance type, an ultrasonic wave type, or an infrared type according to an operating manner. Among such types, the capacitance type is a type in which when the touch screen is touched by a conductive object, a position of the object is sensed using a capacitance variation between the object and a transparent sensing electrode. A capacitance type touch screen has the following good characteristics as compared with other types of touch screens: long life, thin thickness, and fast response. For this reason, the capacitance type touch screen is used in various fields.

As a screen of an electronic device becomes larger and the size of the electronic device is scaled down, recently, a touch screen coupled with a display is used as a unique input means without an input device such as a keypad.

The extended application of such a touch sensing device accompanies a variation in an input manner: a manner for sensing two or more multi-touch inputs. To recognize two or more touch inputs at the same time, it is necessary to sense relative motions of two or more touch inputs or to sense absolute coordinates of two or more touch inputs independently. In recent years, a lot of manufacturers have used a touch screen to which a drive-sensing principle for computing absolute coordinates of multi-touch inputs is applied to overcome a ghost phenomenon.

In case of the multi-touch input, in general, there is no problem to recognize a multi-touch input about plural points that are spaced apart from each other on a screen. However, when a plurality of touch inputs occurs at adjacent points, regions where touch inputs occur are partially overlapped. On this occasion, there is a problem to recognize the touch inputs as independent touch inputs, respectively. Also, when a touch input having a wide area occurs, it is not recognized as one touch input, but it is erroneously recognized as a plurality of touch inputs. Thus, there is required a multi-touch input processing method for computing an input point exactly when touch inputs simultaneously occur at a plurality of points adjacent to each other.

DISCLOSURE

Technical Problem

Embodiments of the inventive concept provide multi-touch input processing method and device capable of calculating an input point exactly when a plurality of touch inputs occurs at adjacent regions.

Technical Solution

One aspect of embodiments of the inventive concept is directed to provide a multi-touch input processing method comprising determining whether an overlapping region exists between a first input region and a second input region, when a multi-touch input occurs on a touch panel; computing a center point of the first input region, a center point of the second input region, and a center point of the overlapping region when the overlapping region exists; determining a first straight line passing through the center point of the first input region, a second straight line passing through the center point of the second input region, and a third straight line passing through the center point of the overlapping region; computing the sum of touch input forces of a peripheral region of each of the first straight line, the second straight line, and the third straight line; and comparing the sum of the touch input forces of the peripheral region of the first straight line or the second straight line with the sum of touch input forces of the peripheral region of the third straight line to determine whether to merge the first input region and the second input region.

The overlapping region may be a region of which the touch input force is greater than or equal to a threshold value for determining whether to be included in the first input region and the second input region and which has cells not included in the first input region and the second input region.

A center point of the input region may be computed based on touch input forces of coordinates of cells included in the input region.

The center point of the input region may be computed by determining an x-axis coordinate value of the center point of the input region and a y-axis coordinate value of the center point of the input region, the x-axis coordinate value being determined by multiplying a touch input force of a corresponding cell and an x-coordinate value of each cell in the input region, summing up multiplication values about the cells, and dividing the addition value by the sum of touch input forces of all cells in the input region and the y-axis coordinate value being determined by multiplying a touch input force of a corresponding cell and a y-coordinate value of each cell in the input region, summing up multiplication values about the cells, and dividing the addition value by the sum of touch input forces of all cells in the input region.

The center point of the overlapping region may be placed on a straight line connecting the center point of the first input region and the center point of the second input region and may be set to an internally dividing point at which the straight line connecting the center point of the first input region and the center point of the second input region is internally divided in a ratio of the sum of touch input forces of cells included in the first input region to the sum of touch input forces of cells included in the second input region.

The first straight line, the second straight line, and the third straight line may be perpendicular to a straight line connecting the center point of the first input region and the center point of the second input region.

The computing of the sum of touch input forces may include selecting cells, at which a distance between the cell and the straight line is shorter than a distance between adjacent cells of a touch screen, from among cells of the touch panel as target cells; adding a weight to touch input forces of the target cells; and summing touch input forces of the weighted target cells.

The weight may be inversely proportional to the distance between the cell and the straight line.

The distance between the cell and the straight line may be a distance from a center point of the cell up to the straight line in an x-axis direction when a slope of the straight line has a value greater than "1". The distance between the cell and the straight line may be a distance from a center point of the cell up to the straight line in a y-axis direction when a slope of the straight line has a value smaller than "1".

The comparing of the sum of the touch input forces may include multiplying a relatively small one of the sum of touch input forces of the peripheral region of the first straight line and the sum of touch input forces of the peripheral region of the second straight line by a predetermined number, merging the first input region and the second input region when the multiplication value is greater than the sum of touch input forces of the peripheral region of the third straight line, and not merging the first input region and the second input region when the multiplication value is not greater than the sum of touch input forces of the peripheral region of the third straight line.

Another aspect of embodiments of the inventive concept is directed to provide a multi-touch input processing device include a touch panel and a touch sensor chip. The touch panel receives a touch signal of a user. The touch sensor chip determines whether an overlapping region exists between a first input region and a second input region, when a multi-touch input occurs on a touch panel, computes a center point of the first input region, a center point of the second input region, and a center point of the overlapping region when the overlapping region exists, determines a first straight line passing through the center point of the first input region, a second straight line passing through the center point of the second input region, and a third straight line passing through the center point of the overlapping region, computes the sum of touch input forces of a peripheral region of each of the first straight line, the second straight line, and the third straight line, and compares the sum of the touch input forces of the peripheral region of the first straight line or the second straight line with the sum of touch input forces of the peripheral region of the third straight line to determine whether to merge the first input region and the second input region.

Advantageous Effects

According to an exemplary embodiment of the inventive concept, when a multi-touch input occurs on adjacent regions, whether to merge touch input regions may be determined based on shapes of sensed touch input regions and input forces, thereby making it possible to compute an input position more exactly when a touch input occurs.

BEST MODE

Figure 1:
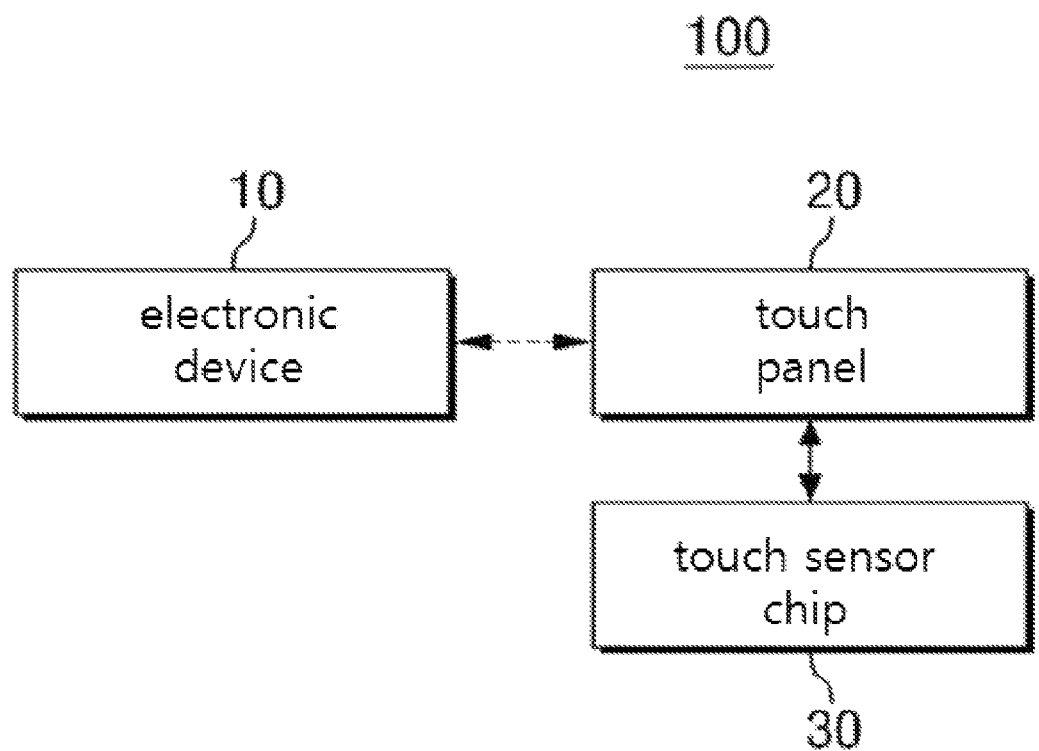
FIG. 1 is a diagram showing a configuration of a multi-touch input processing device according to an exemplary embodiment of the inventive concept.

Hereinafter, exemplary embodiments of the present invention will be described. In the drawings, the thickness and spacing are schematically illustrated for convenience in description and may be exaggerated in comparison to an actual thickness. In describing the present invention, a well-known configuration unrelated to the gist of the present invention may be omitted.

In the specification, in adding reference numerals to elements throughout the drawings, it is to be noted that like reference numerals refer to like elements even though elements are shown in different drawings.

Multi-touch input processing method and device according to an exemplary embodiment of the inventive concept will be described with reference to accompanying drawings.

FIG. 1 is a diagram showing a configuration of a multi-touch input processing device according to an exemplary embodiment of the inventive concept.

Referring to FIG. 1, a multi-touch input processing device 100 according to an exemplary embodiment of the inventive concept may contain an electronic device 10, a touch panel 20, and a touch sensor chip 30.

The electronic device 10 may be disposed around the touch panel 20 and may mean a device that is driven by a clock signal or a driving signal to generate an electromagnetic wave. For example, since the touch panel 20 is generally disposed on a display panel for displaying images, the electronic device 10 may be a display panel, a voltage supply unit for supplying a voltage to the touch panel 20, or an electronic device that is disposed outside the multi-touch input processing device 100 including the touch panel 20 and generates an electromagnetic wave.

The electronic device 10 may be a display panel. As a panel for displaying images, the display panel may be liquid crystal display panel, electrophoretic display panel, OLED (Organic Light Emitting Diode) panel, LED panel, inorganic EL (Electro Luminescent Display) panel, FED (Field Emission Display) panel, SED (Surface-conduction Electrone-mitter Display) panel, PDP (Plasma Display Panel), or CRT (Cathode Ray Tube) display panel. The touch panel 20 may be stacked on one surface of the display panel. For the sake of easy understanding, an embodiment of the inventive concept is exemplified as the electronic device 10 is a display panel. However, the scope and spirit of the inventive concept may not be limited thereto. It is obvious that there are used all electronic devices 10 that generate an electromagnetic wave outside the touch panel 20 and affect an operation of the touch panel 20.

The display panel may be a liquid crystal display panel that is driven using a clock signal. An embodiment of the inventive concept is exemplified as the electronic device 10 is a liquid crystal display panel among display panels. However, the scope and spirit of the inventive concept may not be limited thereto. It is obvious that there are used various sorts of display panels driven by a clock signal or a driving signal.

The touch panel 20 may be disposed to be adjacent to the electronic device 10 and may receive user's touch signals. The touch panel 20 may be disposed on a display panel for displaying images and may receive user's touch signals. The touch panel 20 may be a panel that receives user's touch signals and may be implemented in various shapes without limitation to a specific shape. For example, the touch panel 20 may be formed to have a two-layer structure. On this occasion, a touch sensor may be implemented with an array of pixels that are respectively formed at intersections of a plurality of driving electrode traces (e.g., traces extending in a Y-axis direction) and a plurality of sense electrode traces (e.g., traces extending in an X-axis direction). Alternatively, the touch panel 20 may be implemented with a touch panel 20 that has single-layered touch sensors disposed on the same plane and fabricated on one surface of a single substrate.

The touch sensor chip 30 may apply a driving signal to the touch panel 20 and may receive a sensing signal from the touch panel 20. That is, the touch sensor chip 30 may apply driving signals to the driving electrode traces of the touch panel 20 and may receive sensing signals from the sense electrode traces of the touch panel 20. The touch sensor chip 30 may determine a touch position of a user, based on the driving signals applied to the touch panel 20 and the sensing signals received from the touch panel 20.

The touch sensor chip 30 may be mounted on the touch panel 20 and may be disposed on the same plane as the driving electrode traces and the sense electrode traces of the touch panel 20. In some embodiments, the touch sensor chip 30 may be mounted on not the touch panel 20 but a separate circuit board, and the circuit board on which the touch sensor chip 30 is mounted may be electrically connected with the touch panel 20.

Meanwhile, when a multi-touch input is generated at adjacent points, the touch sensor chip 30 according to an exemplary embodiment of the inventive concept may determine whether to merge two touch input regions in the light of shapes of two sensed touch input regions and a characteristic of an input intensity.

When a touch occurs on the touch panel 20, the touch sensor chip 30 may determine whether an overlapping region exists between a first input region and a second input region by the touch input. When the overlapping region exists, the touch sensor chip 30 may compute a center point of the first input region, a center point of the second input region, and a center point of the overlapping region, may determine a first straight line passing through the center point of the first input region, a second straight line passing through the center point of the second input region, and a third straight line passing through the center point of the overlapping region, may compute the sum of touch input forces of peripheral regions of the first through third straight lines, and may determine whether to merge the first input region and the second input region by comparing the sum of touch input forces of the peripheral region of the first or second straight line with the sum of touch input forces of the peripheral region of the third straight line.

The overlapping region may mean a region of which the touch input force is greater than or equal to a threshold value for determining whether to be included in the first input region and the second input region and which has cells not included in the first input region and the second input region.

Upon computing the sums of touch input forces of the peripheral regions of the first through third straight lines, the touch sensor chip 30 may determine cells, of which the cell-to-straight line distance is shorter than a distance between adjacent cells of a touch screen, from among cells of the touch panel, as target cells, may add weights to touch input forces of the target cells, and may sum up touch input forces of the weighted target cells.

At this time, a weight may be inversely proportional to a distance between a cell and a straight line. When a slope of a straight line has a value greater than "1", the distance from a cell to a straight line may be a distance from a center of a cell up to a straight line in an x-axis direction. When a slope of a straight line has a value smaller than "1", the distance from a cell to a straight line may be a distance from a center of a cell up to a straight line in a y-axis direction.

The touch sensor chip 30 may multiply a relatively small value of the sum of touch input forces of the peripheral region of the first straight line and the sum of touch input forces of the peripheral region of the second straight line by a predetermined number. When a value obtained through the multiplication is greater than the sum of touch input forces of the peripheral region of the third straight line, the touch sensor chip 30 may merge the first region and the second region. Meanwhile, when a value obtained through the multiplication is not greater than the sum of touch input forces of the peripheral region of the third straight line, the touch sensor chip 30 may not merge the first region and the second region.

A multi-touch input processing operation of the touch sensor chip 30 will be more fully described with reference to FIG. 2.

Figure 2:
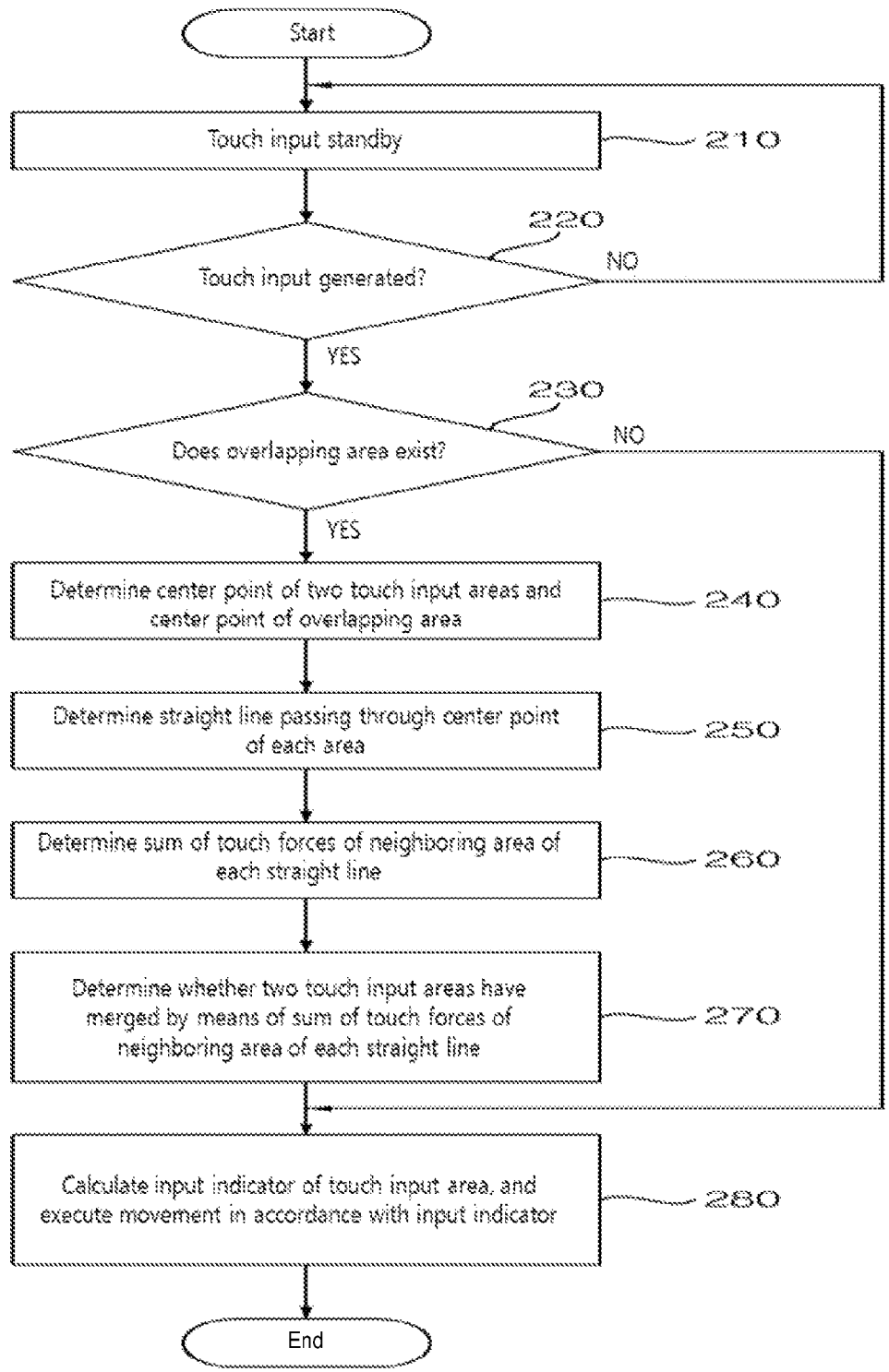
FIG. 2 is a diagram showing an operation of a multi-touch input processing method according to an exemplary embodiment of the inventive concept.

FIG. 2 is a diagram showing an operation of a multi-touch input processing method according to an exemplary embodiment of the inventive concept. Referring to FIG. 2, in step 210, a touch sensor chip 30 according to an exemplary embodiment of the inventive concept may wait for a touch input. In step 220, the touch sensor chip 30 may determine whether a touch input occurs. As a consequence of determining that no touch input occurs, the method proceeds to step 210. As a consequence of determining that a touch input occurs, the method proceeds to step 230.

Figure 3:
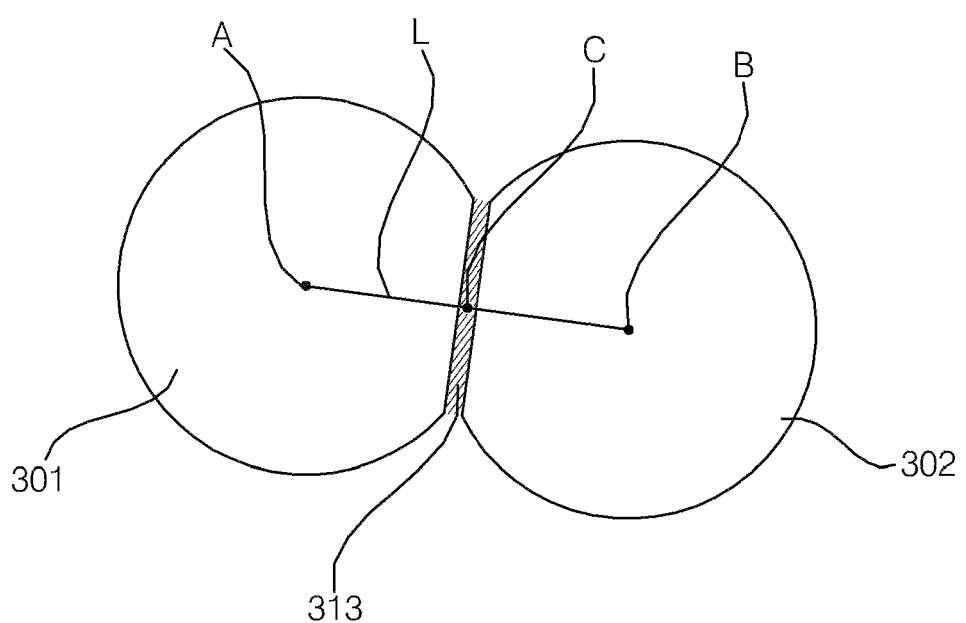
FIG. 3 is a diagram showing an embodiment where a multi-touch input occurs at adjacent points during an input through a touch screen.

In step 230, the touch sensor chip 30 may determine whether an overlapping region exists at an input portion. FIG. 3 is a diagram showing an embodiment where a multi-touch input occurs at adjacent points during an input through a touch screen. When a multi-touch input occurs, the touch sensor chip 30 may parse a touch input force of each cell on a touch screen by sensing a variation in capacitance, may perform a noise cancelling operation, may determine an input region using watershed algorithm, and may compute the touch input coordinates (center point) of input regions in light of touch input forces of coordinates. The cell may mean a unit region by which a touch input force is calculated on the touch screen.

In general, upon determining a region through the watershed algorithm, a region may be determined through an operation of comparing a touch input force of a cell with a predetermined threshold value. When touch inputs occur on two adjacent regions, that is, a first input region 301 and a second input region 302 and, thus, a region 313 at which two regions are overlapped exists, a value of a touch input force of the region 313 where the two input regions 301 and 302 are overlapped may be greater than a threshold value. However, conflict cells may exist which are not included in both regions. That is, a value of a touch input force may be greater than a threshold value for determining whether to be included in the first and second input regions 301 and 302, or cells may exist which are not included in both regions.

When a touch input occurs and the overlapping region 313 including conflict cells exists, the multi-touch input processing device 100 according to an exemplary embodiment of the inventive concept may determine whether to merge the first and second input regions 301 and 302.

Returning to FIG. 2, as a consequence of determining that the overlapping region 313 does not exist (in step 230), the method proceeds to step 280 because there is determined that a normal multi-touch input occurs. In step 280, the touch sensor chip 30 may compute the input coordinates of a touch input region.

As a consequence of determining that the overlapping region 313 exists (in step 230), the method proceeds to step 240, in which center points of the tow touch input regions 301 and 302 and a center point of the overlapping region 313 are determined.

The touch sensor chip 320 may compute center points A and B of the first and second input regions 301 and 302 that are adjacent to each other. In general, a center point of each touch input region may be computed based on input forces of the coordinates of an input region. For example, an x-axis coordinate value of a center point of a touch input region may be computed by summing up values, obtained by multiplying an x-coordinate value and a touch input force of each of cells of a region together, and dividing a resultant value of the multiplication by the sum of touch input forces of all cells of the region. A y-axis coordinate value of the center point may be computed by summing values, obtained by multiplying a y-coordinate value and a touch input force of each of cells of a region together, and dividing a resultant value of the multiplication by the sum of touch input forces of all cells of the region. The coordinates of a center point may be expressed by the following equation 1 where "S" indicates an input force of a cell, "x" indicates an x-coordinate value of corresponding coordinates, and "y" indicates a y-coordinate value of the corresponding coordinates.

An x-coordinate of a center point=$\Sigma(S^*x)/\Sigma S$

A y-coordinate of a center point=$\Sigma(S^*y)/\Sigma S$ [Equation 1]

The center point A of the first input region 301 and the center point B of the second input region 302 may be computed, and then a straight line L may be determined which connects the center point A of the first input region 301 and the center point B of the second input region 302. Next, the touch sensor chip 30 may determine a center point C of the overlapping region 313 that is placed on the straight line L. The point C may be set to an internally divided point at which the straight line L is internally divided in a ratio of a first value to a second value. Here, the first value may be obtained by summing up touch input forces of cells that the first region 301 includes, and the second value may be obtained by summing up touch input forces of cells that the second region 302 includes.

For example, when the sum of touch input forces of cells included in the first region 301 is "100" and the sum of touch input forces of cells included in the second region 302 is "50", a point on the straight line L that is spaced apart by two-third (⅔) of a length of the straight line L from the center point A of the first region 301 may be determined as the center point C of the overlapping region 313.

In step 250, the touch sensor chip 30 may determine straight lines AL, BL, and CL that pass through the center points of the regions 301, 302, and 313, respectively.

Figure 4:
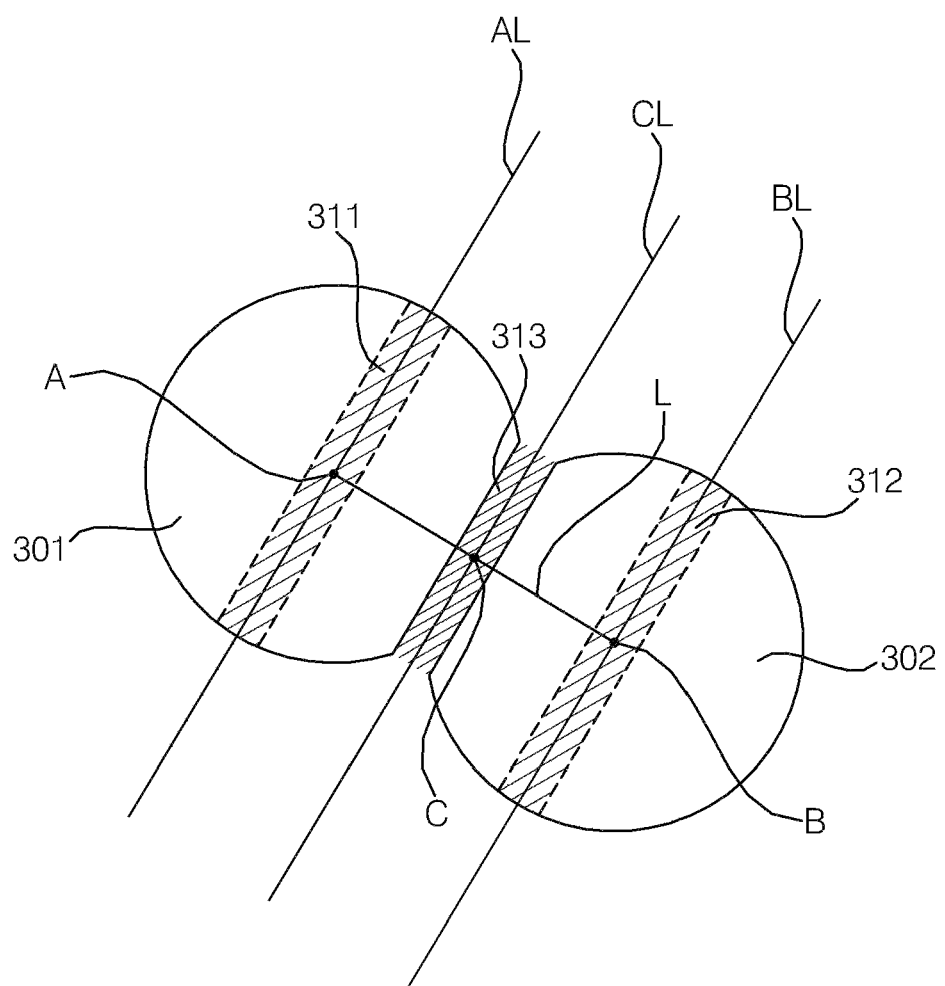
FIG. 4 is a diagram showing center points of input regions, straight lines passing through the center points, and peripheral regions of the straight lines, at a multi-touch input processing operation according to an exemplary embodiment of the inventive concept.

FIG. 4 is a diagram showing center points of input regions, straight lines passing through the center points, and peripheral regions of the straight lines, at a multi-touch input processing operation according to an exemplary embodiment of the inventive concept. Referring to FIG. 4, the touch sensor chip 30 may determine a straight line AL passing through a center point A and intersecting a straight line L, a straight line BL passing through a center point B and intersecting the straight line L, and a straight line CL passing through a center point C and intersecting the straight line L.

In step 260, the touch sensor chip 30 may compute touch input forces of peripheral regions of the straight lines AL, BL, and CL passing through the center points A, B, and C. A method for computing touch input forces of peripheral regions of the straight lines AL, BL, and CL will be as follows.

Figure 5:
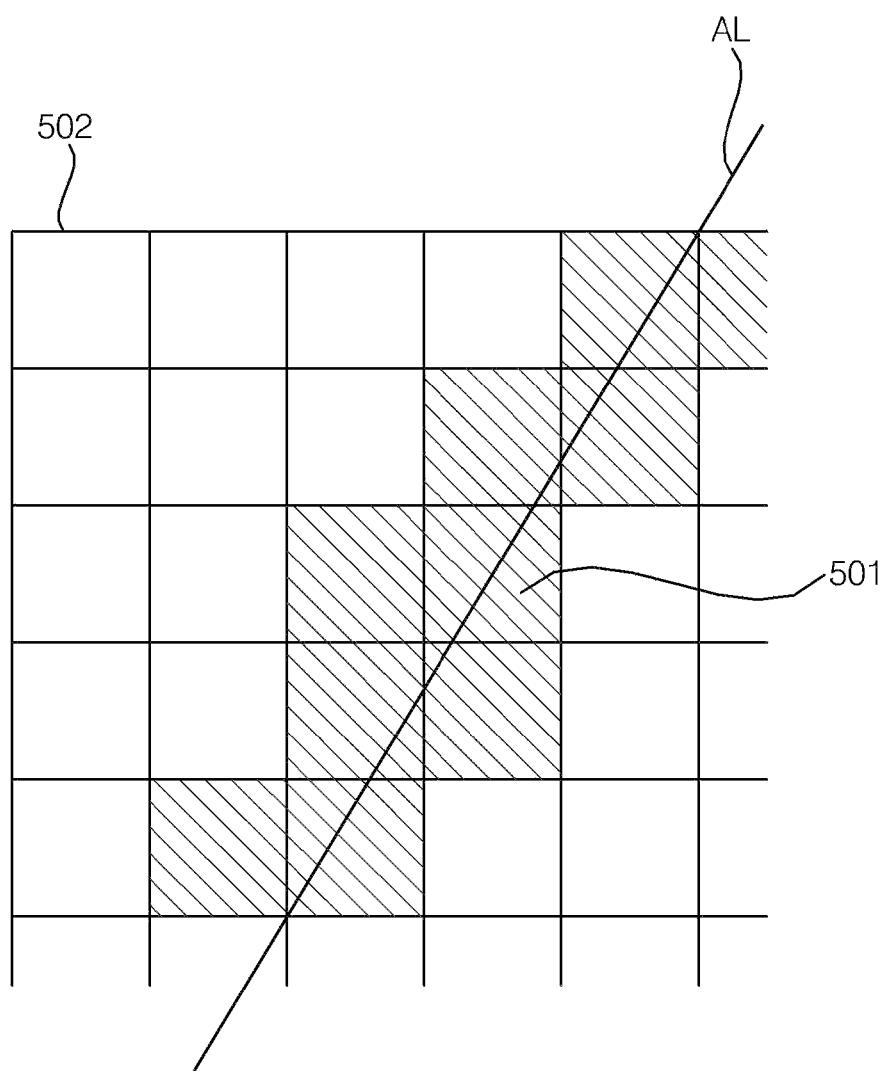
FIG. 5 is a diagram showing target cells needed to compute the sum of input forces of a peripheral region a straight line passing through a center point, at a multi-touch input processing operation according to an exemplary embodiment of the inventive concept.

FIG. 5 is a diagram showing target cells needed to compute the sum of input forces of a peripheral region a straight line passing through a center point, at a multi-touch input processing operation according to an exemplary embodiment of the inventive concept. For example, target cells of a peripheral region of the straight line AL may be selected upon computing touch input forces of a peripheral region of the straight line AL.

Selected as target cells are cells, in which a straight-line distance up to the straight line AL passing through a center point is shorter than a distance "d" between adjacent cells of a touch screen, from among cells 502 of the touch screen.

A straight-line distance from the cell to the straight line AL may mean a straight-line distance from a center point of a cell up to the straight line AL in an x-axis direction of the touch screen when a slope of the straight line AL has a value greater than or equal to "1", and it may mean a straight-line distance from a center point of a cell up to the straight line AL in a y-axis direction of the touch screen when the slope of the straight line AL has a value smaller than "1".

Figure 6:
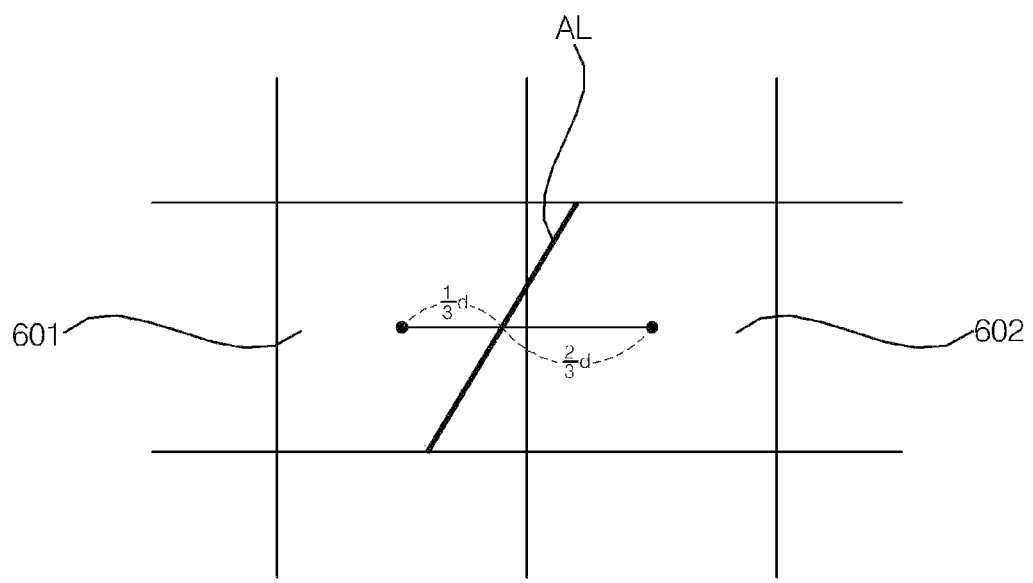
FIG. 6 is a diagram showing a straight line passing through a center point and cells at a peripheral region of the straight line, at a multi-touch input processing operation according to an exemplary embodiment of the inventive concept.

Touch input forces of cells selected as target cells may be respectively multiplied by weights, and resultant values of the multiplication may be summed up. FIG. 6 is a diagram showing a straight line passing through a center point and cells at a peripheral region of the straight line, at a multi-touch input processing operation according to an exemplary embodiment of the inventive concept.

Referring to FIG. 6, a weight may be set to be inversely proportional to a distance between a target cell and a straight line AL. For example, assuming that a distance between a center point of a first cell 601 and a center point of a second cell 602 is "d", a distance between the center point of the first cell 601 and the straight line AL is "(⅓)d", and a distance between the center point of the second cell 602 and the straight line AL is "(⅔)d", a weight of "⅔" may be added to a touch input force of the first cell 601, and a weight of "⅓" may be added to a touch input force of the second cell 602. In the event that the straight line AL passes through a center point of a specific cell, a touch input force of a corresponding cell may have a weight of "1".

Assuming that a weight to be applied to a cell at the (i,j) coordinates is "$w_{ij}$", a distance between center points of adjacent cells of a touch screen is "d", and a distance between the cell at the (i,j) coordinates and a straight line passing through a center is "$r_{ij}$", the weight "$w_{ij}$" to be applied to a cell at the (i,j) coordinates may be expressed by the following equation 2.

$w_{ij}=(d-r_{ij})/d$ [Equation 2]

With the above-described operation, the sum of touch input forces of target cells of a peripheral region of the straight line AL may be computed by applying a weight to the touch input forces of the target cells of the peripheral region of the straight line AL and summing up the weighted touch input forces.

A touch input force of a peripheral region of a straight line (AL, BL, CL) passing through a center point may be expressed by the following equation 3.

$S_t=\Sigma S_{ij}((d-r_{ij})/d)$ [Equation 3]

In the equation 3, "$S_t$" may indicate a touch input force of a peripheral region of a straight line (AL, BL, CL) passing through a center point, "$S_{ij}$" may indicate a touch input force of a target cell at the (i,j) coordinates, and "d" may indicate a distance between adjacent cells of a touch screen. Also, "$r_{ij}$" may indicate a distance between a center point of the target cell at the (i,j) coordinates and a straight line passing through a center point in an x-axis direction when a slope of the straight line passing through a center point has a value greater than or equal to "1" and may indicate a distance between the center point of the target cell at the (i,j)

coordinates and the straight line passing through the center point in a y-axis direction when the slope of the straight line passing through a center point has a value smaller than "1".

Touch input forces of a peripheral region of each of straight lines BL and CL may be summed up substantially the same as touch input forces of a peripheral region of the straight line AL.

Afterwards, in step 270, whether to merge the first input region 301 and the second input region 302 may be determined based on the sums of touch input forces of peripheral regions of the straight lines AL, BL, and CL.

Whether to merge the first input region 301 and the second input region 302 may be determined as follows. First, comparison may be made between the sum of touch input forces of the peripheral region of the straight line AL passing through a center point and the sum of touch input forces of the peripheral region of the straight line BL passing through a center point to select a relatively small value, and the selected value and a predetermined value may be multiplied together. In exemplary embodiments, the predetermined value may be "6/10". The predetermined value may be variable within a range from "4/10" to "8/10" according to an environment characteristic or a condition.

Next, a value obtained by multiplying the selected value and "6/10" may be compared with the sum of touch input forces of the peripheral region of the straight line CL. If the sum of touch input forces of the peripheral region of the straight line CL is greater than the value obtained through the multiplication, two touch input regions 301 and 302 may be merged. Otherwise, the two touch input regions 301 and 302 may not be merged.

It is assumed that the sum of forces of a peripheral region of a straight line passing through a center point of a first region is "Ast", the sum of forces of a peripheral region of a straight line passing through a center point of a second region is "BSt", and the sum of forces of a peripheral region of a straight line passing through a center point of an overlapping region is "CSt". Under this assumption, the first and second regions may be merged when CSt is greater than "min(ASt, BSt)*6/10" and may not be merged when CSt is not greater than "min(ASt, BSt)*6/10".

After a merge operation is performed based on to whether to merge (step 270), in step 280, the input coordinates of the merged touch input region or the input coordinates of each of touch input regions not merged may be computed.

Multi-touch input processing method and device according to an exemplary embodiment of the inventive concept may be implemented as described above. While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

The invention claimed is:

1. A multi-touch input processing method comprising:
   determining whether an overlapping region exists between a first input region and a second input region, when a multi-touch input occurs on a touch panel;
   computing a center point of the first input region, a center point of the second input region, and a center point of the overlapping region when the overlapping region exists;
   determining a first straight line passing through the center point of the first input region, a second straight line passing through the center point of the second input region, and a third straight line passing through the center point of the overlapping region;
   computing a sum of touch input forces of a peripheral region of each of the first straight line, the second straight line, and the third straight line; and
   comparing the sum of the touch input forces of the peripheral region of the first straight line or the second straight line with the sum of touch input forces of the peripheral region of the third straight line to determine whether to merge the first input region and the second input region,
   wherein the center point of the each of the first input region and the second input region is computed by determining an x-axis coordinate value of the center point of each of the first input region and the second input region and a y-axis coordinate value of the center point of each of the first input region and the second input region, the x-axis coordinate value being determined by multiplying a touch input force of a corresponding cell and an x-coordinate value of each cell in each of the first input region and the second input region, summing up multiplication values about the cells, and dividing the addition value by the sum of touch input forces of all cells in each of the first input region and the second input region and the y-axis coordinate value being determined by multiplying a touch input force of a corresponding cell and a y-coordinate value of each cell in each of the first input region and the second input region, summing up multiplication values about the cells, and dividing the addition value by the sum of touch input forces of all cells in each of the first input region and the second input region.

2. The multi-touch input processing method of claim 1, wherein the overlapping region is a region of which each touch input force of the first input region and the second input region is greater than or equal to a threshold value for determining whether to be included in the first input region and the second input region and which has cells not included in the first input region and the second input region.

3. The multi-touch input processing method of claim 1, wherein a center point of the input region is computed based on touch input forces of coordinates of cells included in the first input region and the second input region.

4. The multi-touch input processing method of claim 1, wherein the center point of the overlapping region is placed on a straight line connecting the center point of the first input region and the center point of the second input region and is set to an internally dividing point at which the straight line connecting the center point of the first input region and the center point of the second input region is internally divided in a ratio of the sum of touch input forces of cells included in the first input region to the sum of touch input forces of cells included in the second input region.

5. The multi-touch input processing method of claim 1, wherein the first straight line, the second straight line, and the third straight line are perpendicular to a straight line connecting the center point of the first input region and the center point of the second input region.

6. A multi-touch input processing method comprising:
   determining whether an overlapping region exists between a first input region and a second input region, when a multi-touch input occurs on a touch panel;
   computing a center point of the first input region, a center point of the second input region, and a center point of the overlapping region when the overlapping region exists;
   determining a first straight line passing through the center point of the first input region, a second straight line passing through the center point of the second input region, and a third straight line passing through the center point of the overlapping region;

computing a sum of touch input forces of a peripheral region of each of the first straight line, the second straight line, and the third straight line; and comparing the sum of the touch input forces of the peripheral region of the first straight line or the second straight line with the sum of touch input forces of the peripheral region of the third straight line to determine whether to merge the first input region and the second input region, wherein the computing of the sum of touch input forces includes:

selecting cells, at which a distance between the cell and the straight line is shorter than a distance between adjacent cells of a touch screen, from among cells of the touch panel as target cells;

adding a weight to touch input forces of the target cells; and summing up touch input forces of the weighted target cells, wherein the distance between the cell and the straight line is a distance from a center point of the cell up to the straight line in an x-axis direction when a slope of the straight line has a value greater than "1", and wherein the distance between the cell and the straight line is a distance from a center point of the cell up to the straight line in a y-axis direction when a slope of the straight line has a value smaller than "1".

7. The multi-touch input processing method of claim 6, wherein the weight is inversely proportional to the distance between the cell and the straight line.

8. The multi-touch input processing method of claim 1, wherein the comparing of the sum of the touch input forces includes:

multiplying a relatively small one of the sum of touch input forces of the peripheral region of the first straight line and the sum of touch input forces of the peripheral region of the second straight line by a predetermined number and merging the first input region and the second input region when the multiplication value is greater than the sum of touch input forces of the peripheral region of the third straight line.

9. The multi-touch input processing method of claim 1, wherein the comparing of the sum of the touch input forces includes:

multiplying a relatively small one of the sum of touch input forces of the peripheral region of the first straight line and the sum of touch input forces of the peripheral region of the second straight line by a predetermined number and not merging the first input region and the second input region when the multiplication value is not greater than the sum of touch input forces of the peripheral region of the third straight line.

10. A multi-touch input processing device comprising:
a touch panel configured to receive a touch signal of a user; and
a touch sensor chip configured to:
determine whether an overlapping region exists between a first input region and a second input region, when a multi-touch input occurs on a touch panel,
compute a center point of the first input region, a center point of the second input region, and a center point of the overlapping region when the overlapping region exists,
determine a first straight line passing through the center point of the first input region, a second straight line passing through the center point of the second input region, and a third straight line passing through the center point of the overlapping region, compute a sum of touch input forces of a peripheral region of each of the first straight line, the second straight line, and the third straight line, and compare the sum of the touch input forces of the peripheral region of the first straight line or the second straight line with the sum of touch input forces of the peripheral region of the third straight line to determine whether to merge the first input region and the second input region, wherein the center point of each of the first input region and the second input region is computed by determining an x-axis coordinate value of the center point of each of the first input region and the second input region and a y-axis coordinate value of the center point of each of the first input region and the second input region, the x-axis coordinate value being determined by multiplying a touch input force of a corresponding cell and an x-coordinate value of each cell in each of the first input region and the second input region, adding up multiplication values about the cells, and dividing the addition value by the sum of touch input forces of all cells in each of the first input region and the second input region and the y-axis coordinate value being determined by multiplying a touch input force of a corresponding cell and a y-coordinate value of each cell in each of the first input region and the second input region, adding up multiplication values about the cells, and dividing the addition value by the sum of touch input forces of all cells in each of the first input region and the second input region.

11. The multi-touch input processing device of claim 10, wherein the overlapping region is a region of which the touch input force is greater than or equal to a threshold value for determining whether to be included in the first input region and the second input region and which has cells not included in the first input region and the second input region.

12. The multi-touch input processing device of claim 10, wherein a center point of each of the first input region and the second input region is computed based on touch input forces of coordinates of cells included in each of the first input region and the second input region.

13. The multi-touch input processing device of claim 10, wherein the center point of the overlapping region is placed on a straight line connecting the center point of the first input region and the center point of the second input region and is set to an internally dividing point at which the straight line connecting the center point of the first input region and the center point of the second input region is internally divided in a ratio of the sum of touch input forces of cells included in the first input region to the sum of touch input forces of cells included in the second input region.

14. The multi-touch input processing device of claim 10, wherein the first straight line, the second straight line, and the third straight line are perpendicular to a straight line connecting the center point of the first input region and the center point of the second input region.

15. The multi-touch input processing device of claim 10, wherein to compute the sum of touch input forces of a peripheral region of each of the first straight line, the second straight line, and the third straight line is to select cells, at which a distance between the cell and the straight line is shorter than a distance between adjacent cells of a touch screen, from among cells of the touch panel as target cells, add a weight to touch input forces of the target cells, and sum touch input forces of the weighted target cells.

16. The multi-touch input processing device of claim 10, wherein to compare the sum of the touch input forces of the peripheral region of the first straight line or the second straight line with the sum of touch input forces of the peripheral region of the third straight line to determine whether to merge the first input region and the second input region is to multiply a relatively small one of the sum of touch input forces of the peripheral region of the first straight line and the sum of touch input forces of the peripheral region of the second straight line by a predetermined number and merge the first input region and the second input region when the multiplication value is greater than the sum of touch input forces of the peripheral region of the third straight line.

17. The multi-touch input processing device of claim 10, wherein to compare the sum of the touch input forces of the peripheral region of the first straight line or the second straight line with the sum of touch input forces of the peripheral region of the third straight line to determine whether to merge the first input region and the second input region is to multiply a relatively small one of the sum of touch input forces of the peripheral region of the first straight line and the sum of touch input forces of the peripheral region of the second straight line by a predetermined number and not merge the first input region and the second input region when the multiplication value is not greater than the sum of touch input forces of the peripheral region of the third straight line.

* * * * *